United States Patent
More et al.

(10) Patent No.: US 11,829,288 B2
(45) Date of Patent: Nov. 28, 2023

(54) MAPPING OF OBJECT DATA AND METADATA IN AN OBJECT STORAGE VOLUME

(71) Applicant: Seagate Technology LLC, Fremont, CA (US)

(72) Inventors: Shankar Tukaram More, Pune (IN); Vidyadhar Charudatt Pinglikar, Pune (IN); Nikita Danilov, San Francisco, CA (US); Ujjwal Lanjewar, Pune (IN)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/705,196

(22) Filed: Mar. 25, 2022

(65) Prior Publication Data

US 2023/0205686 A1   Jun. 29, 2023

(30) Foreign Application Priority Data

Dec. 27, 2021   (RU) .................. 2021138888

(51) Int. Cl.
   *G06F 3/06*   (2006.01)
   *G06F 12/02*   (2006.01)
(52) U.S. Cl.
   CPC .......... *G06F 12/0238* (2013.01); *G06F 3/061* (2013.01); *G06F 3/0631* (2013.01); *G06F 3/0689* (2013.01); *G06F 2212/1016* (2013.01)

(58) Field of Classification Search
   CPC .... G06F 3/061; G06F 3/00631; G06F 3/0689; G06F 12/0238
   USPC ......................................... 711/202
   See application file for complete search history.

(56) References Cited

U.S. PATENT DOCUMENTS

| | | | |
|---|---|---|---|
| 9,772,787 B2 | 9/2017 | Oikarinen et al. | |
| 9,852,151 B1 | 12/2017 | Youngworth | |
| 10,120,797 B1* | 11/2018 | Foley | G06F 12/109 |
| 10,268,408 B2 | 4/2019 | Shah et al. | |
| 10,613,933 B2 | 4/2020 | Bennett, Jr. et al. | |
| 11,093,532 B2 | 8/2021 | Eda et al. | |
| 2003/0023811 A1* | 1/2003 | Kim | G06F 3/0601 |
| | | | 711/114 |
| 2022/0334726 A1* | 10/2022 | Ogawa | G06F 3/0647 |
| 2022/0342542 A1* | 10/2022 | Alkalay | G06F 3/064 |

* cited by examiner

*Primary Examiner* — Than Nguyen
(74) *Attorney, Agent, or Firm* — Mueting Raasch Group

(57) ABSTRACT

A volume for object storage encompasses a single logical block address space and the first range of logical block addresses being within the single logical block address space. A first and second range of logical block addresses are initially allocated within the single logical block address space of the volume for storing respective object metadata and object data. One or both of the first and second ranges of logical block addresses are reallocated to increase storage utilized by one of the object metadata and the object data.

20 Claims, 6 Drawing Sheets

MAPPING OF OBJECT DATA AND METADATA IN AN OBJECT STORAGE VOLUME

RELATED APPLICATIONS

This application claims the benefit of priority under 35 U.S.C. § 119(a) of RU Application No. 2021138888, filed 27 Dec. 2021, the disclosure of which is incorporated by reference herein in its entirety.

SUMMARY

The present disclosure is directed to mapping of object data and metadata in an object storage device. In one embodiment, a method involves initially allocating a first range of logical block addresses of a volume for storing object metadata. The volume encompasses a single logical block address space and the first range of logical block addresses are within the single logical block address space. A second range of logical block addresses are initially allocated within the single logical block address space of the volume. The second range of logical block addresses are allocated for storing object data. The object metadata and the object data are stored in the volume for use by an object file system at the respective first and second ranges of logical block addresses. One or both of the first and second ranges of logical block addresses are reallocated to increase storage utilized by one of the object metadata and the object data.

In another embodiment, an apparatus includes a host interface configured to access one or more storage drives. The one or more storage drives are represented as a volume encompassing a single logical block address space. A controller is coupled to the host interface and configured to initially allocate a first range of logical block addresses within the single logical block address space of the volume for storing object metadata. A second range of logical block addresses within the single logical block address space of the volume are initially allocated for storing object data. The object metadata and the object data are stored in the volume according to the first and second ranges of logical block addresses for use by an object file system. One or both of the first and second ranges of logical block addresses to are reallocated increase storage utilized by one of the object metadata and the object data.

In another embodiment, a system includes an array of storage drives represented as a volume encompassing a single logical block address space. A host interface of the system is configured to access the array. A controller of the system is coupled to the host interface and configured to: initially allocate a first range of logical block addresses to a first tier of the array within the single logical block address space of the volume for storing object metadata; initially allocate a second range of logical block addresses to a second tier within the single logical block address space of the volume for storing object data, the first tier having higher performance than the second tier; store the object metadata and the object data in the volume according to the first and second ranges of logical block addresses for use by an object file system; and reallocate one or both of the first and second ranges of logical block addresses to increase storage utilized by one of the object metadata and the object data.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
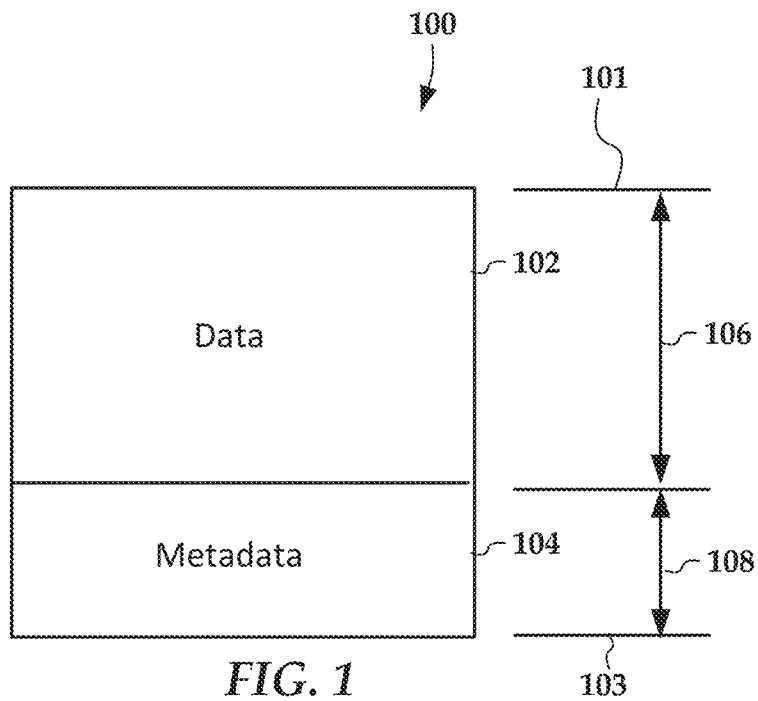
FIG. 1 is a diagram of showing different types of data in an object storage device according to an example embodiment.

The present disclosure is generally related to object storage. Storage devices have traditionally used a combination of block-based storage and filesystems, in which data structures (e.g., metadata, files, directories) of the filesystems are mapped to locations (e.g., block addresses) on the device. A traditional filesystem typically uses a fixed metadata structure that stored on a data storage device (e.g., hard disk drive, solid state drive, RAID subsystems, optical storage) together with the associated data files. At least some of these data structures are located at predetermined addresses so that a host computer can easily find a root of the filesystem, which enables traversing the entire file system hierarchy. For directories, this metadata may include block addresses of various files and subdirectories stored on the directory. For individual files, this metadata may include a location of the start of the file and a size of the file. For both files and directories, the metadata may also include a name of the file/directory, timestamps of created, edited, etc., and flags for read/write permissions, etc.

In a traditional filesystem, the drive itself has no knowledge of whether a particular address is being used to store data, metadata, etc. All of the metadata is maintained by the host, e.g., the computer that is attached to the drive. The drive treats all data equally, although may perform some data analysis such as tracking read and write activity for the purposes of caching so that more commonly used data can be accessed in a faster tier of local storage.

The metadata for commonly used file systems (e.g., ext filesystems used in Linux, ntfs filesystems used in Windows) usually provides limited indications about of the content of the file. For example, commonly used filename extensions (e.g., *.docx, *.jpg, *.mp3) indicates (but does not guarantee) a type of data stored in the file (e.g., word processing document, image, streaming media, etc.). While the files themselves may contain metadata that is descriptive of the data file (e.g., tags indicating title, composer, track number, etc. embedded in MP3 files), this depends on a particular file format and is not generally extendible to all data stored on the drive.

Traditional filesystems and block storage are effective for many uses. For example, the hierarchy of a filesystem is easily represented in a user interface as collections of folders and files. In such a case, when a user selects of a file to edit it, it is straightforward to map the filesystem path of the selected file to a starting block address of the file, and then load at least part of the file into random access memory for the use of an editor program. In other cases, traditional filesystems are not so efficient. For example, for files that are accessed in a large-scale storage system (e.g., clustered storage), namespace collisions of individual files may occur amongst the many different filesystems that are accessible on the storage system.

In order to address these issues of traditional filesystems, the concept of object storage has been introduced. Object storage removes some of the lower-level details of storage (e.g., mapping of data to block addresses) from the end-users of the data, e.g., operating systems, applications, systems administrators. Instead of data being mapped as files to local filesystem structures, the data is treated as objects with a unique identifier. This unique identifier is used for access operations such as read and write. The unique identifier is also associated with a metadata structure. Object storage metadata can be stored separately from the object data and can be extended more easily than the metadata traditional filesystems, which usually have limits on the type and size of metadata stored. Because the drives (or storage subsystems) have an understanding of particular objects, the drives can make decisions about how to store the data to optimize aspects such as access times, indexing, reliability, recoverability, etc.

Object storage supports variable-sized, user-defined metadata. Users can attach several tags to the object. Tags and their associated data can provide functionality for large storage sets such as searching, sorting, big data analysis, etc. These tags are stored in the object's metadata, which is typically stored separately from the object itself. Over time, tags and associated info can accumulate for each object, increasing its metadata size.

Storage systems may impose limits on the size of the metadata. For example, where a dedicated storage device or array is designated for metadata storage, the size of the storage device or array may inherently put a limit on the amount of metadata storage that can be used. Other factors, such as metadata search time, may also be used to constrain the amount of allowable metadata. If there is a time requirement for returning metadata search results, then this requirement may not be met if the metadata repository is too large.

Generally, a system administrator may overprovision the amount of storage dedicated to metadata in anticipation of future growth. Unlike a traditional filesystem, which has a predictable amount of metadata needed based on the total storage size (e.g., the entire usable block address space), an object storage metadata can grow unpredictably depending on how much the end users utilize the tags and how large the data is that is associated with the tags. Overprovisioning can result in less usable space for object data, as every byte reserved for storing metadata in such a scenario is a byte that cannot be used for storing object data. On the other hand, there may be applications where the ability to rapidly increase the amount of metadata is just as important to the end users as the object storage space itself.

Embodiments are described herein in which an object storage device supports dynamically-sized, user-defined metadata without predefined constraints (e.g., a predefined size of metadata). Although both object and metadata storage will ultimately be constrained by the capacity of the storage device, the system can allow the metadata storage to be increased as much as desired within these constraints. This system can be configured for fast metadata access/search times, e.g., enabling low latency and minimizing time to first byte (TTFB).

In FIG. 1, a diagram illustrates concepts related to an object storage device according to an example embodiment. A data storage device 100 encompasses a single logical block address space, as indicated by first and second extents 101, 103. The term "storage volume" or "volume" may also be used interchangeably to describe the data storage device 100, as this is how applications and operating systems may refer to this kind of device. The data storage device 100 may include an individual drive such as a hard disk drive (HDD) or solid-state drive (SSD) with a single host interface, e.g., SATA, SCSI, NVMe, etc. In such an arrangement, the drive may include a single type of media (e.g., magnetic disk, flash memory) or multiple types of memory, such as a hybrid drive that uses flash memory for caching hot data and disks for storing cold data. In other cases, the data storage device 100 may be an array of drives of the same or different type (e.g., redundant array of independent disks or RAID array) that are presented as a single storage device with the single logical address space indicated by first and second extents 101, 103.

The addresses used by the object storage device 100 will be referred to herein as logical block addresses (LBAs). An LBA is a value (typically a number and often expressed as a hexadecimal value) that is used to reference the smallest block of addressable data on the storage device 100. An LBA space should have a predefined minimum and maximum address, and each LBA should be assigned to a unique and independent block of physical data of a predetermined size. Note that the size of a block of data referenced by an LBA may be different than the size of data stored on the physical media, due to error correction codes, overprovisioning, etc., that increase the size of the stored block compared to what is written or read by a host or controller.

In an HDD, the LBA may be mapped to individual data sectors on the disks. The mapping of LBAs to sectors on an HDD may be fairly direct, e.g., with LBA 0 mapped to a first user data sector S0, LBA 1 mapped to the next sector S1, etc. There are ways to adjust the mapping and/or the LBA space to account for bad sectors. In an SSD, the LBA may be mapped to individual pages of memory. In contrast to an HDD, and SSD may use a more complex mapping of LBAs to pages. This is because the SSD pages need to be erased before being written to. When overwriting an LBA at previously written-to page, is more efficient to write to a different, already-erased page and remap the old LBA to the new page than it is to first erase and then rewrite the original page. Also, because SSD pages deteriorate with age, a flexible logical-to-physical mapping table allows evenly distributing wear amongst all the physical memory, even if a relatively small portion of the total LBA space is being used.

Referring again to FIG. 1, a first part 102 of the data storage device 100 is dedicated to storing object data, and a second part 104 of the data storage device 100 is dedicated to storing object metadata. Generally, object data refers to data of piece of user managed content. The object may conform to the generally accepted definition of a computer file, or a part thereof. Note that some types of objects, such as media files, may contain their own embedded metadata, but this is considered different from the object metadata stored in the second part 104. The object metadata is created and maintained for the benefit of an object storage system, is generic to all content, and is stored separately from the object data. The object metadata is linked to one or more objects, and if all the one or more objects are deleted, the metadata is deleted too.

Generally, in embodiments described below, object data and metadata will share the same storage space or volume. This at least involves the storage space or volume having a contiguous LBA range. The total storage space of the volume is the sum of storage space 108 dedicated to object metadata and storage space 106 dedicated to object data. In embodiments described below, techniques are described for flexibly changing one or both sizes of storage spaces 106, 108 that are within LBA space defined by extents 101, 103.

Figure 2:
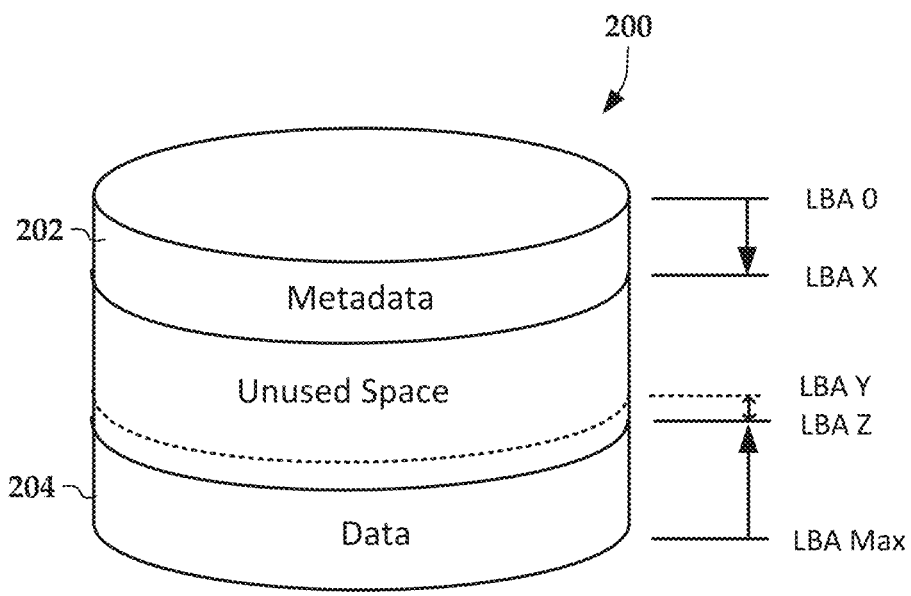
FIG. 2 is a diagram showing an object data and metadata allocation scheme according to an example embodiment.

In FIG. 2, a diagram shows an object storage data and metadata allocations scheme according to an example embodiment. A storage device 200 has a first portion storing object metadata 202 and second portion storing object data 204. The object metadata 202 used a lower range of LBA space, in this example LBA 0 to LBA X, where X may change over time, typically increasing. Metadata space 202 can be memory mapped and may use high performance storage media (in the case of a single device) or high-performance storage devices (in the case of an array). The object data 204 is stored in an address space that is delimited on one end by the highest LBA in the range, in this example LBA Max. The LBA Z is the low LBA for the object data 204. When allocating additional space for the object data 204, an LBA lower than Z will be used, as represented by the dashed line corresponding to LBA Y, Y<Z.

Figure 3:
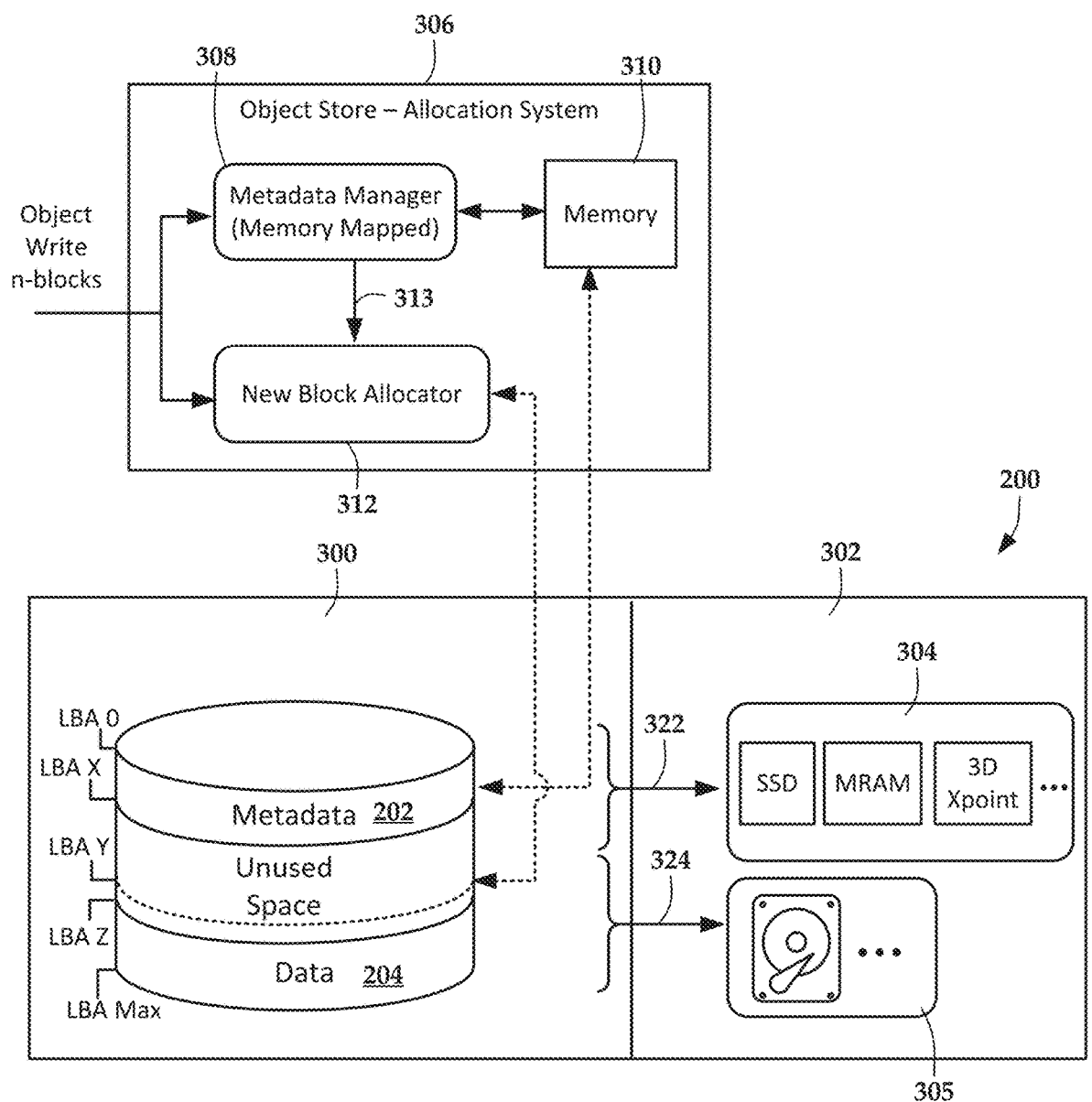
FIG. 3 is a diagram showing block allocation system according to an example embodiment

In order to flexibly adapt existing systems to the block allocation as shown in FIG. 2, block allocation modules may be used to allocate LBAs when new objects and metadata are created or existing objects and metadata are changed causing their size to increase. In FIG. 3, a diagram illustrates operations of a block allocation system according to an example embodiment. The data storage device 200 from FIG. 2 is illustrated here, including logical view of the device 200 as a volume 300 and a physical view 302 which includes one or more drives 304, 305 and other optional components, such as a backplane and array controller (not shown). The data storage device 200 may be arranged so that faster drives 304 are assigned to a lower LBA range on the volume 300 and slower drives 305 are assigned to higher LBAs on the volume 300.

An allocation system 306 may include a metadata manager 308 that maps some of the metadata 202 to volatile memory 310, e.g., through a caching or virtual memory scheme. A block allocator 312 allocates blocks of storage on the volume 300 for object storage. At initialization, the metadata manager 308 may memory-map the entire metadata storage space 202 from lower LBA space of the volume a (LBA 0 to LBA X in this figure). Memory mapping involves creating a mapping between a region of volatile memory, such as dynamic random access memory (DRAM), and a corresponding range of non-volatile storage. Space for new metadata 202 will be allocated based on the memory-map. After every allocation, the metadata max LBA (LBA X to a threshold) will be updated and communicated to the block allocator 312, as indicated by line 313. For additional safety, read-only space can be reserved after LBA X, to prevent overlap.

Logical volume namespaces for metadata and object data can be divided and mapped to different set of physical volumes (PV) based on performance requirements, here indicated be metadata space 322 and object data space 324. Metadata space 322 can be physically mapped to a tier of high performance, low latency storage drives 304. Object data space 324 can be stored in a lower performance tier of storage, as indicated by drives 305.

The algorithms used by the block allocator 312 for new/changed objects and new/changed metadata may be adapted to account for the fact that the target LBA space may occasionally have a different upper bound (in the case of metadata 202) and a different lower bound (in the case of object data 204). Such algorithms may, for example, search through a data structure that describes the unallocated memory between a lower LBA and an upper LBA. In such a case, if there is a request for a 10 storage blocks, the algorithm may search from beginning to end through this data structure to find the first span of 10 consecutive unallocated LBAs, and remove those LBAs from the structure (or mark the LBAs as allocated) once the blocks are written to. If 10 consecutive blocks can't be found, non-consecutive blocks may be used instead, resulting in the object being fragmented. Therefore, when there is a reallocation as shown by the dashed line in FIG. 2, this algorithm can add new LBAs to the beginning or end of such a data structure (or somewhere else in the structure depending on its form) to be used as unallocated LBAs.

Figure 4:
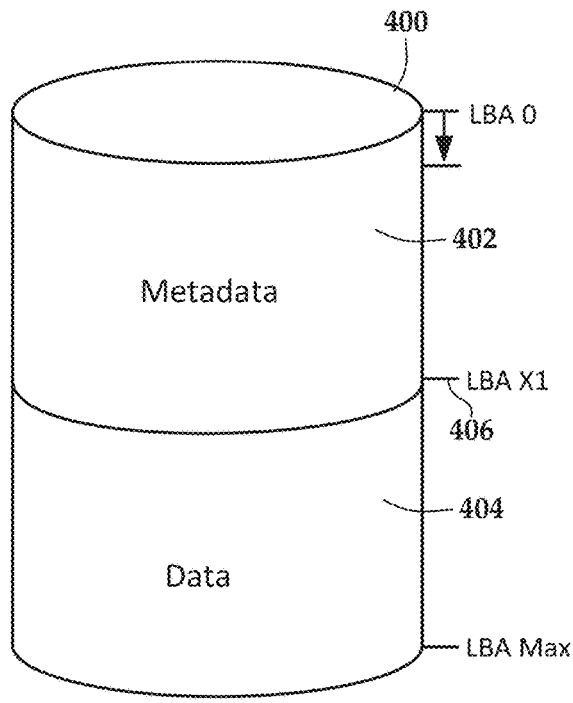
FIGS. 4-6 are diagrams showing an object data and metadata allocation scheme according to another example embodiment.
Figure 5:
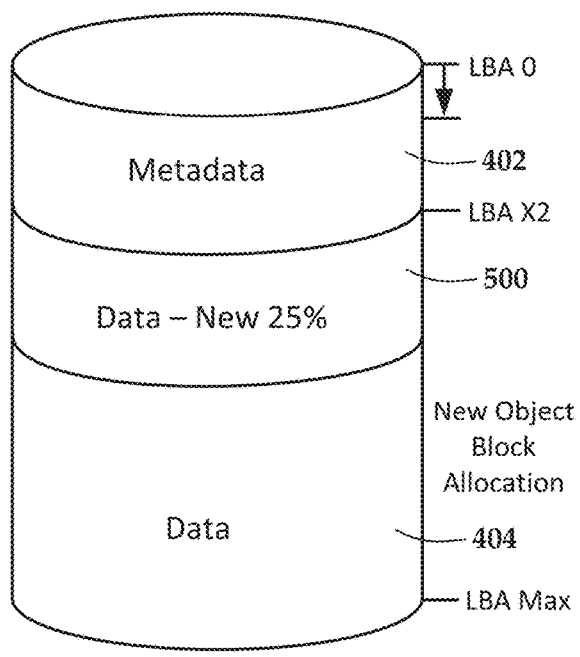
Figure 6:
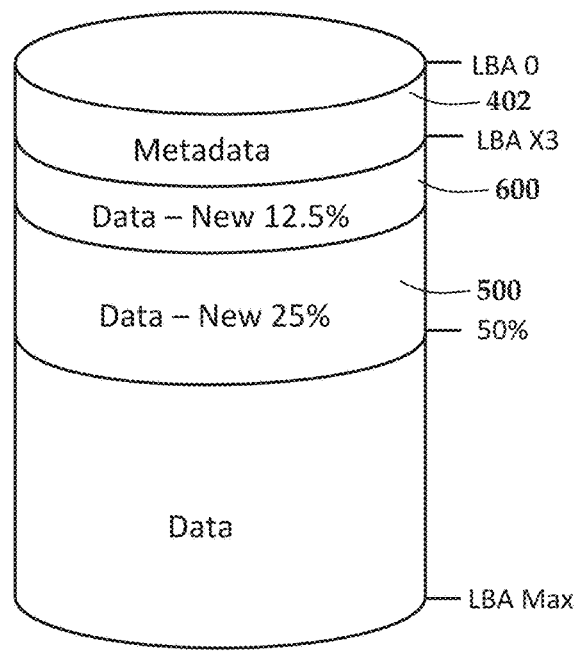

In FIGS. 4-6, block diagrams show operations of a block allocation system according to another example embodiment. A seen in FIG. 4, a volume 400 is initialized with a default allocation between object data 404 and metadata 402. In particular, an entirety of the single logical block address space of the volume is initially allocated between the first and second ranges of logical block addresses associated with the object data 404 and metadata 402. In this example, the object data 404 and metadata 402 each are allocated 50% of the total storage space, as indicated by LBA X1 406, which demarcates the division between object data 404 and metadata 402. Note that other initial demarcations may be used besides 50% to 50%, e.g., 40% to 60%, 45% to 55%, 60% to 40%, etc.

The block allocator will, based on demand, keep expanding space by allocating from remaining space from one or the other of the object data 404 or metadata 402. Expansion will occur such that a certain fraction of space from one section will be allocated, then the same fraction will be taken from the remaining space each time a new allocation is needed. As seen in FIGS. 5 and 6, this expansion is shown for two allocations, where one half of the existing metadata space 402 is reallocated and added to the object data space. In FIG. 5, one half of the current metadata space 402 is reallocated as new object data space 500 for use in object storage. Because metadata space 402 was 50% of total capacity before the reallocation, both the new object data space 500 and the re-sized metadata space 402 are both 25% of the total capacity. After the reallocation, both new object data space 500 and old object data space 404 are used for object data storage.

In FIG. 6, one half of the current metadata space 402 is reallocated as new object data space 600 for use in object storage. Because metadata space 402 was 25% of total capacity before the reallocation, both the new object data space 500 and the re-sized metadata space 402 are both 12.5% of the total capacity. After the reallocation, both new object data space 600 and old object data spaces 404, 500 are used for object data storage. For all of these reallocations, the maximum LBA of the metadata space 402 is modified, and this can be repeated until metadata 402 cannot be reduced any more, e.g., there is insufficient threshold to reduce metadata storage space any more. A similar expansion can be done to increase metadata space 402 at the expense of object storage space 404.

Another way to view the reallocation shown in FIGS. 4-6 is to consider a ratio R that defines a data size for reallocating from metadata to data, or vice versa. For each reallocation N>1, an amount of the total volume capacity equal to $R^{-(N+1)}$ is reallocated from metadata to data, or vice versa. For the example in FIGS. 5, R=2 and N=1, so the size of new object data space 500 is $2^{-2}=¼$ of the total. In FIGS. 6, R=2 and N=2, so the new object data space 600 is $2^{-3}=⅛$ of the total. Any value of R>1 can be used to define these reallocations.

As noted above, devices within different speed and latency of storage access may be used within an array, the higher performing devices being generally allocated to metadata and the lower performing devices being allocated to object data. This can also be the case for an individual device. For example, some hard disk drives may have flash memory caches (sometimes referred to as hybrid drives) to speed up some operations. Those drives usually hide the faster memory behind a caching algorithm such that it may not be possible for a host or array controller to expressly designate that certain data gets stored in flash memory and other data gets stored on magnetic disk. However, such adaptation may be possible, e.g., presenting the flash memory and disks as two separate devices at the host interface.

Figure 7:
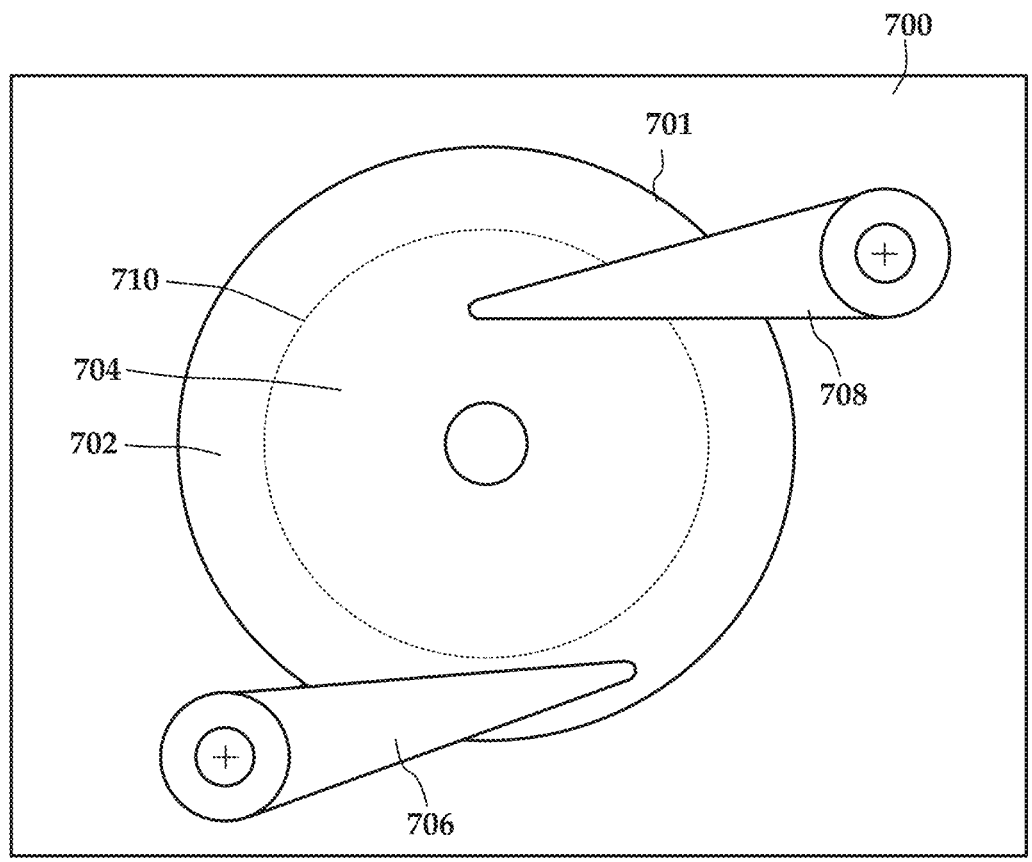
FIG. 7 is a diagram of showing a multiple actuator disk drive storage arrangement for object data and metadata allocation according to an example embodiment.

In FIG. 7, a diagram illustrates how data can be segregated within a single disk drive 700 according to an example embodiment. Each surface of a disk 701 is divided into two zones 702, 704. Each zone 702, 704 read by a different head mounted on different actuators 706, 708, which each generally include an arm and a voice coil motor that rotates the arm. The drive 700 may have multiple such disks 701, each with similarly arranged zones on one or both major surfaces. Generally, the zone 702 will have faster read/write performance because the disk surface moves faster relative to the read/write head at outer diameters. Also, assuming the actuators 706, 708 are dedicated to the respective zones 702, 704, lower seek times for the drive as a whole may result because the actuators do not have to move fully between the inner and outer diameters.

In some embodiments, the outer zones 702 can be dedicated to metadata and the inner zones 704 can be dedicated to object data. The track 710 (which corresponds to a cylinder that intersects to all disk surfaces) that demarcates the zones 702, 704 can be changed in location to reallocate data between the zones 702, 704 as shown in the embodiments of FIGS. 3-6. The drive 700 may allow each actuator 706, 708 to be controlled as a separate logical unit by a host or controller, such that the actuators 706, 708 function as separate drives with different performance characteristics. Multiple drives of this configuration can be arrayed together, e.g., with all outer zones mapped to a first tier of storage and all inner zones mapped to a second tier of storage.

Figure 8:
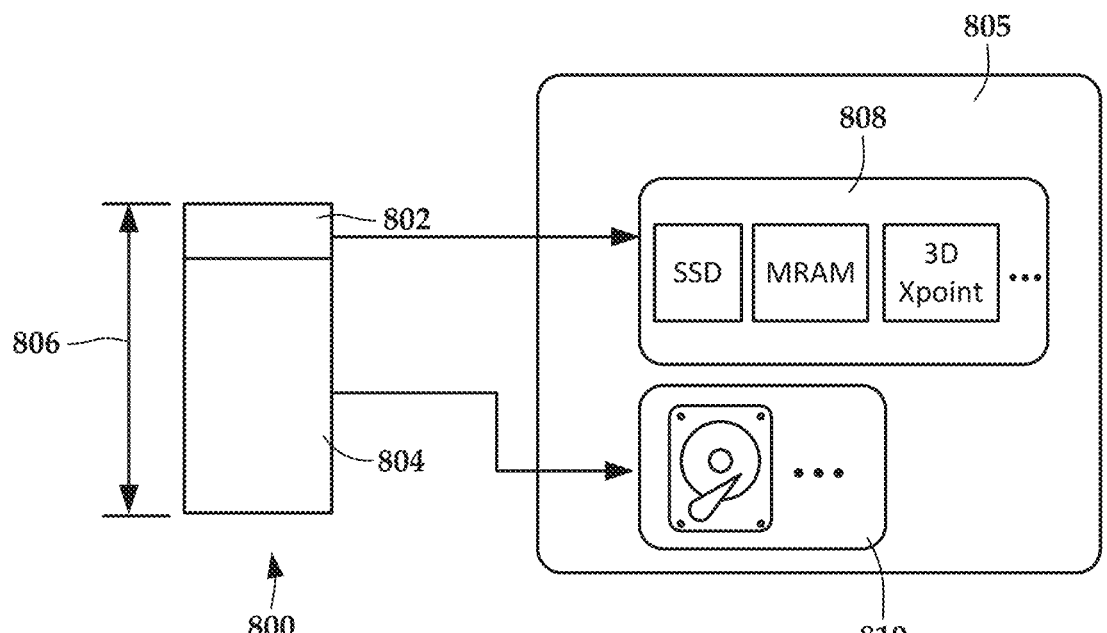
FIG. 8 shows a storage scheme for object data according to an example embodiment.

As described above, system performance can be improved by storing object metadata in a faster tier of storage. Object data is typically much larger than the metadata, and so will often be stored in a tier of storage that has lower cost and relatively lower performance, such as magnetic disk drives. However, it may be possible to distribute the object data on a volume to increase TTFB without significantly increasing storage costs. In FIG. 8, a diagram shows how an object 800 may be stored in a storage system according to an example embodiment. The object 800 is divided into a first chunk 802 and a remainder 804. The first chunk 802 corresponds to a start address of the object 800, which is the first part of the object 800 that would be requested when the object 800 is read from the system.

A volume 805 on which the object 800 is stored has a first tier 808 and a second tier 810 of storage. The first tier 808 has higher performance than the second tier 810, such as by using different types of storage drives in an array as shown in FIG. 8. Separate actuators of a single drive as shown in FIG. 7 can be used to create the tiers 808, 810 in addition to or instead of the different types of drives. The first chunk 802 of the object data is stored in the first tier 808 and a remainder 804 of the object not in the first chunk being stored in the second tier 810. The first chunk 802 can be requested in parallel such that the first chunk 802 can quickly be transferred. The remainder 804 of the object 800 may have some delay in arriving, and ideally this would correspond to when the last bytes of the first chunk 802 are done being transmitted to the requestor. The expected delay from the second tier 810 of this kind of data retrieval as well as the performance of the first tier 808 can be used to estimate the chunk size. Generally, systems with greater disparities between performance of the first and second tiers 808, 810 will benefit from larger first chunk sizes.

The system may use the same first chunk size for all objects, and the size of remainders 804 may vary, as the total object size 806 will likely vary between different objects. The system may reserve a special storage location (e.g., LBA range) for the first chunks 802. In other embodiments, the first chunk 802 may be considered part of the object metadata and stored with other metadata created for the object 800. For example, the first chunk 802 may be considered a "preview" of the object 800. One difference from other commonly used metadata is that other excerpts from the object 800 that are stored as metadata (e.g., a preview image for an image or video file) may be duplicative of what is in the object data, but the first chunk 802 is an exact copy of part of the object 800 and need not be stored in the object data space (e.g., data space 102 in FIG. 1). The first chunk 802 may still be duplicated in the object storage space in some embodiments, e.g., for the convenience of backing up or migrating data.

Figure 9:
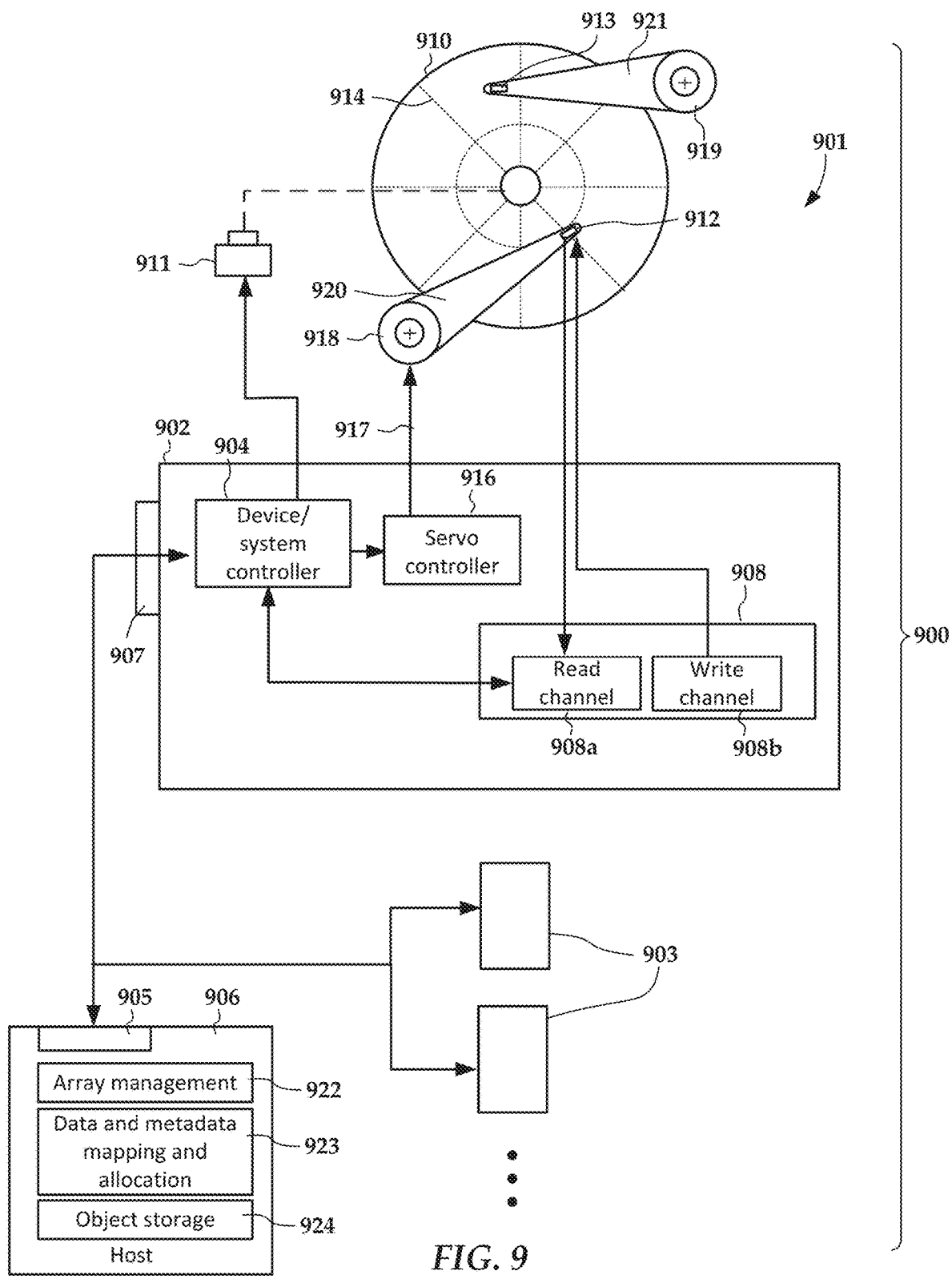
FIG. 9 is a block diagram of a system and apparatus according to an example embodiment.

The embodiments described herein may be implemented in a wide range of storage systems. In FIG. 9, a block diagram shows a data storage system 900 according to an example embodiment. The system 900 includes one or more data storage devices, indicated by storage apparatus 901 (e.g., HDD) and additional drives 903. The apparatus 901 includes circuitry 902 such as one or more device/system controllers 904 that process read and write commands and associated data from a host device 906 via a host interface 907. The host device 906 has its own host interface 905. The host interfaces 905, 907 include circuitry that enables electronic communications via standard bus protocols (e.g., SATA, SAS, PCI, NVMe, etc.). The host device 906 may include any electronic device that can be communicatively coupled to store and retrieve data from a data storage device, e.g., a computer, a server, a storage controller, an embedded device. The system controller 904 is coupled to one or more read/write channels 908 (shown here as separate read channel 908a and write channel 908b) that read from and write to a recording media, which in this figure are surfaces of one or more magnetic disks 910 that are rotated by a spindle motor 911.

The read/write channels 908 generally convert data between the digital signals processed by the device controller 904 and the analog signals conducted through one or more heads 912, 913 during read and write operations. The heads may be configured to write using an energy source (e.g., laser for a HAMR device), and may write in various track configurations, such as conventional tracks, shingled magnetic recording (SMR), and interlaced magnetic recording (IMR).

The read/write channels 908 may utilize analog and digital circuitry such as digital-to-analog converters (DACs), analog-to-digital converters (ADCs), detectors, decoders, timing-recovery units, error correction units, etc., and some of this functionality may be implemented in code executable on the digital circuitry. The read/write channels 908 are coupled to the heads 912 via interface circuitry that may include preamplifiers, filters, etc. A separate read channel 908a and write channel 908b are shown, although both may share some common hardware, e.g., digital signal processing chip.

In addition to processing user data, the read channel 908a reads servo data from servo marks 914 on the magnetic disk 910 via the read/write heads 912. The servo data are sent to one or more servo controllers 916 that use the data to provide position control signals 917 to one or more actuators, as represented by voice coil motors (VCMs) 918, 919. In response to the control signals 917, the VCMs 918, 919 rotate respective arms 920, 921 upon which the read/write heads 912, 913 are mounted. The position control signals 917 may also be sent to microactuators (not shown) that individually control each of the heads 912, e.g., causing small displacements at each read/write head.

The host 906 may include various functional modules to perform some of the functions described here. An array manager 922 may work via host protocols to assemble different storage devices 901, 903 into a single volume that encompasses a single LBA space. A data and metadata mapper and allocator 923 determines which addresses of the volume are used for metadata and object data, and may divide the storage devices 901, 903 into different tiers of storage. An object storage module 924 provides an object storage interface for users (e.g., administrators, operating systems, applications) and may exchange data with other modules, e.g., indicating to allocator 923 that new storage may need to be allocated for metadata and/or object data. The object storage module 924 may provide other functions, such as associating unique object identifiers to objects, managing the storage, modification and extension of metadata, etc.

Figure 10:
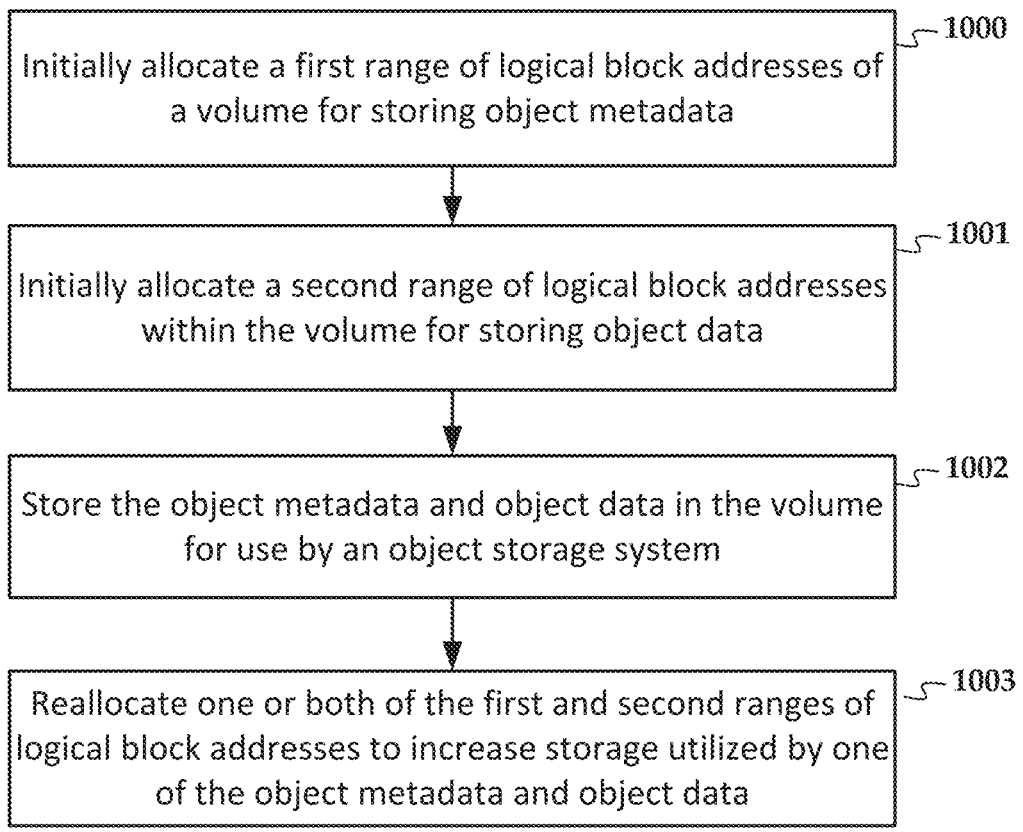
FIG. 10 is a flowchart of a methods according to an example embodiment.

In FIG. 10, a flowchart illustrates a method according to an example embodiment. The method involves initially allocating 1000 a first range of logical block addresses of a volume for storing object metadata. The volume encompasses a single logical block address space and the first range of logical block addresses are within the single logical block space. A second range of logical block addresses are also initially allocated 1001 within the single logical block space of the volume. The second range of logical block addresses allocated for storing object data. The object metadata and object data are stored 1002 in the volume for use by an object file system at the respective the first and second ranges of logical block addresses. One or both of the first and second ranges of logical block addresses are reallocated to increase storage utilized by one of the object metadata and object data. For purposes of this disclosures, reallocating refers to changing at least one LBA associated with an existing range, and may increase or decrease the amount of memory available to a type of data (e.g., object data or metadata) stored in that range.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
initially allocating a first range of logical block addresses of a volume for storing object metadata, the volume encompassing a single logical block address space and the first range of logical block addresses being within the single logical block address space, the first range of logical block addresses being mapped to a first tier of storage;
initially allocating a second range of logical block addresses within the single logical block address space of the volume, the second range of logical block addresses allocated for storing object data, the second range of logical block addresses being mapped to a second tier of storage, the first tier of storage having higher performance than the second tier of storage;
storing the object metadata and the object data in the volume for use by an object file system at the respective first and second ranges of logical block addresses; and
reallocating one or both of the first and second ranges of logical block addresses to increase storage utilized by one of the object metadata and the object data.

2. The method of claim 1, wherein the first tier of storage comprises a first one or more storage drives in an array and the second tier of storage comprises a second one or more storage drives in the array, the first one or more storage drives having higher performance than the second one or more storage drives.

3. The method of claim 1, wherein an unallocated portion of the single logical block address space is not allocated when the first and second ranges of logical block addresses are initially allocated, and wherein the reallocating of one or both of the first and second ranges of logical block addresses comprises utilizing at least part of the unallocated portion to increase the storage utilized by one of the object metadata and the object data.

4. The method of claim 1, wherein an entirety of the single logical block address space is initially allocated between the first and second ranges of logical block addresses, and wherein the reallocating of one or both of the first and second ranges of logical block addresses comprises increasing one of the first and second ranges of logical block addresses and decreasing another of the first and second ranges of logical block addresses.

5. The method of claim 1, wherein, a first chunk of the object data corresponding to a start address of the object data is stored in the first tier and a remainder of the object not in the first chunk is stored in the second tier.

6. The method of claim 5, wherein the first chunk is stored with the object metadata, and the remainder of the object is stored with the object data.

7. The method of claim 1, wherein the first tier of storage comprises a first actuator of a storage drive and the second tier of storage comprises a second actuator of the storage drive, the first actuator having higher performance than the second actuator.

8. The method of claim 1, wherein the volume comprises a first actuator and a second actuator of a single storage drive, the first actuator having higher performance than the second actuator, and wherein a first chunk of the object data corresponding to a start address of the object data is stored using the first actuator and a remainder of the object not in the first chunk is stored using the second actuator.

9. The method of claim 1, wherein the first range of logical block addresses is memory-mapped to a region of volatile memory.

10. An apparatus, comprising:
a host interface configured to access one or more storage drives, the one or more storage drives being represented as a volume for object storage encompassing a single logical block address space; and
one or more controllers coupled to the host interface and configured to:
initially allocate a first range of logical block addresses within the single logical block address space of the volume for storing object metadata, the first range of logical block addresses being mapped to a first tier of storage;
initially allocate a second range of logical block addresses within the single logical block address space of the volume for storing object data, the second range of logical block addresses being mapped to a second tier of storage, the first tier of storage having higher performance than the second tier of storage;
store the object metadata and the object data in the volume according to the first and second ranges of logical block addresses for use by an object file system; and
reallocate one or both of the first and second ranges of logical block addresses to increase storage utilized by one of the object metadata and the object data.

11. The apparatus of claim 10, wherein the one or more storage drives comprise an array.

12. The apparatus of claim 10, wherein an unallocated portion of the single logical block address space is not allocated when the first and second ranges of logical block addresses are initially allocated, and wherein the reallocating of one or both of the first and second ranges of logical block addresses comprises utilizing at least part of the unallocated portion to increase the storage utilized by one of the object metadata and the object data.

13. The apparatus of claim 10, wherein an entirety of the single logical block address space is initially allocated between the first and second ranges of logical block addresses, and wherein the reallocating of one or both of the first and second ranges of logical block addresses comprises increasing one of the first and second ranges of logical block addresses and decreasing another of the first and second ranges of logical block addresses.

14. The apparatus of claim 10, wherein the volume comprises a first tier and a second tier of the one or more storage drives, the first tier having higher performance than the second tier, and wherein a first chunk of the object data corresponding to a start address of the object data is stored in the first tier and a remainder of the object not in the first chunk being stored in the second tier.

15. The apparatus of claim 14, wherein the first chunk is stored with the object metadata, and the remainder of the object is stored with the object data.

16. The apparatus of claim 10, wherein the first tier of storage comprises a first actuator of a hard disk drive and the first tier of storage comprises a second actuator of the hard disk drive, the first actuator having higher performance than the second actuator.

17. A system comprising:
an array of storage drives represented as a volume for object storage encompassing a single logical block address space;
a host interface configured to access the array; and
a controller coupled to the host interface and configured to:
initially allocate a first range of logical block addresses to a first tier of the array within the single logical block address space of the volume for storing object metadata;
initially allocate a second range of logical block addresses to a second tier of the array within the single logical block address space of the volume for storing object data, the first tier having higher performance than the second tier;
store the object metadata and the object data in the volume according to the first and second ranges of logical block addresses for use by an object file system; and
reallocate one or both of the first and second ranges of logical block addresses to increase storage utilized by one of the object metadata and the object data.

18. The system of claim 17, wherein a first chunk of the object data corresponding to a start address of the object data is stored in the first tier and a remainder of the object not in the first chunk being stored in the second tier.

19. The system of claim 18, wherein the first chunk is stored with the object metadata, and the remainder of the object is stored with the object data.

20. The system of claim 17, wherein the array comprises a hard disk drive with a first actuator mapped to the first tier and a second actuator mapped to the second tier.

* * * * *